Jan. 5, 1932.  B. AMES  1,840,007
WINDSHIELD WIPER
Filed June 28, 1929  2 Sheets-Sheet 1
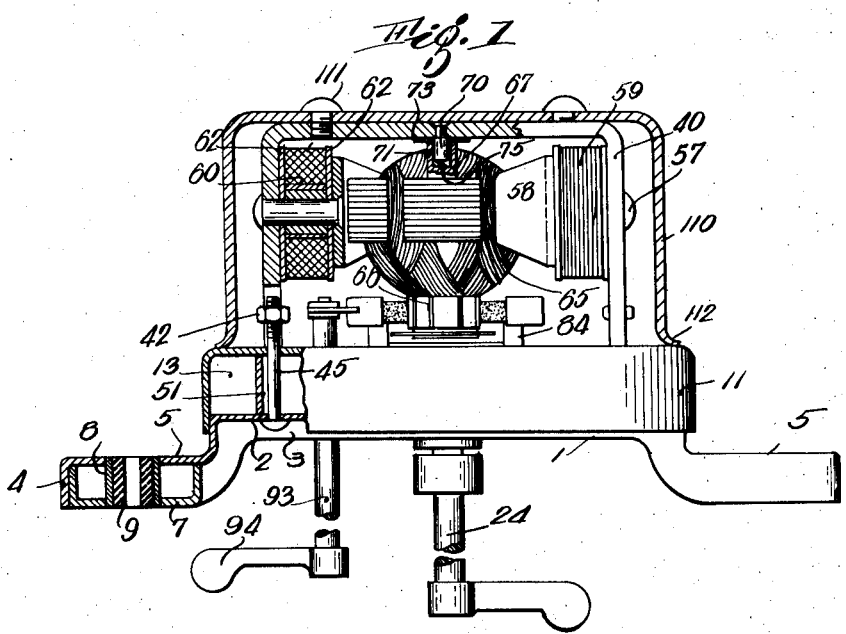
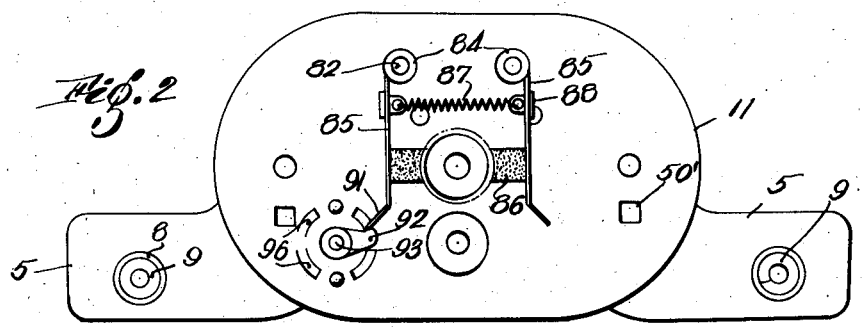
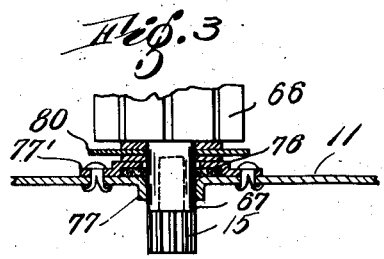
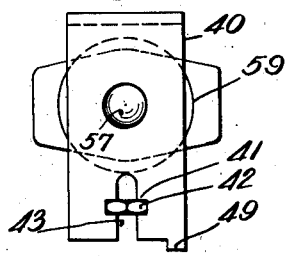
Inventor
Butler Ames
by Roberts, Cushman & Woodbury
his Attorneys Jan. 5, 1932.    B. AMES    1,840,007
WINDSHIELD WIPER
Filed June 28, 1929    2 Sheets-Sheet 2
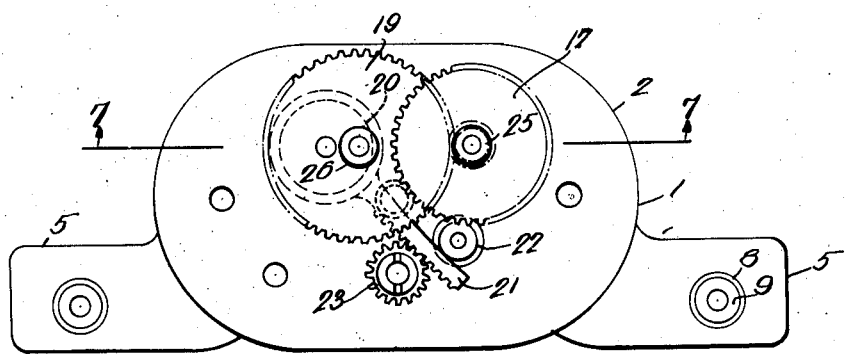
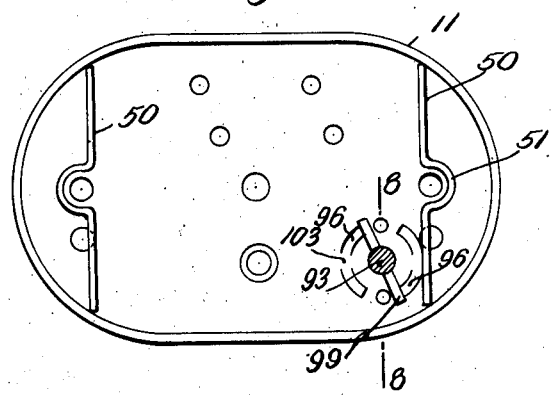
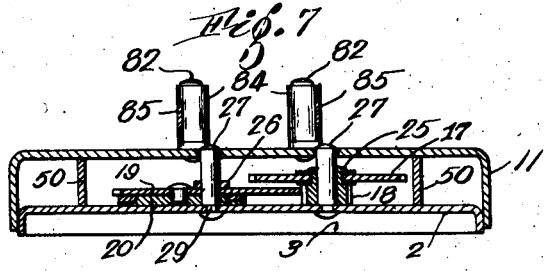
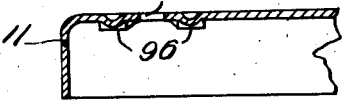

Patented Jan. 5, 1932

1,840,007

UNITED STATES PATENT OFFICE

BUTLER AMES, OF LOWELL, MASSACHUSETTS, ASSIGNOR TO HEINZE ELECTRIC COMPANY, OF LOWELL, MASSACHUSETTS, A CORPORATION OF MAINE

WINDSHIELD WIPER

Application filed June 28, 1929. Serial No. 374,345.

This invention relates to an improved windshield wiper of the electrically driven type and more particularly permits the manufacture of a compact, reliable, mechanically and electrically efficient device at a low cost.

For these purposes the wiper assembly is arranged to permit the general use of sheet metal stampings, each of which may be formed in a single operation, and generally employs supporting elements that may be readily riveted in place. Furthermore, this invention provides compact bearing arrangements for the motor shaft whereby the dimensions of the housing for the wiper driving mechanism need not be objectionably large. while in order to permit simplicity in construction and economy of manufacture the switch controlling the operation of the wiper is preferably combined with the arrangement of one of the brushes and the commutator so that separate switch contacts are not necessary.

More specifically, the gearing which is driven by the electric motor and which operates the wiper shaft at a much lower speed is located within a gear housing formed by two sheet-metal members that have cupped portions in interfitting engagement, one of these members forming a support for the wiper and having flanged end portions which may be formed in the same pressing operation as the cupped body portion thereof, these end portions being arranged in interfitting engagement with small cupped elements to provide box-like arms for securing the wiper to the windshield frame or the like. Preferably common fastening means are arranged to clamp the interfitting sheet metal members in engagement to form the gear housing and also to hold the motor in place, the motor being supported upon a U-shaped frame or bracket which may also be formed of sheet metal and which carries the field coils as well as the bearing for the outer end of the motor shaft. Preferably this bearing is so arranged that it is disposed within the end portion of the shaft itself, thus permitting the assembly to be more compact than otherwise possible. At the other end of the shaft, which extends through the wall of the gear casing to drive the gearing contained therein, I provide a special bearing arrangement which is arranged to prevent the entrance of lubricant into the region of the motor, for example to the commutator, the pressed metal of the cupped member forming that portion of the casing being pressed inwardly to form a boss that provides the bearing for this purpose.

Preferably the axles for the gear housing are provided by stud elements which have reduced end portions that extend through openings in one of the sheet metal members and are riveted over upon the same, the ends of these studs being engaged with a comparatively free fit in suitable openings in the other sheet metal member. Thus the axles about which the gears rotate may be easily disposed in place and the sheet metal members readily be assembled in engagement with each other. Suitable sheet metal spacing elements are arranged therebetween to act as spacers and to cooperate with the fastening elements extending therethrough in holding the sheet metal members in proper relation to each other.

In the accompanying drawings:

Fig. 1 is a top view partly in section of my improved windshield wiper;

Fig. 2 is an elevational view of the outer wall of the gear housing showing the manner in which the brushes are supported thereon and the arrangement of the brush positioning cam;

Fig. 3 is a sectional detail illustrating the bearing assembly at the inner or commutator end of the motor shaft;

Fig. 4 is a side elevational view of the motor frame or bracket showing a portion of the fastening means and the field coil associated therewith;

Fig. 5 is an elevational view of the sheet metal support member which forms a part of the gear housing and supports the gearing therein;

Fig. 6 is an elevational view of the sheet metal member which is adapted to interfit with the body portion of the support member to form the gear housing, the sheet metal spacing elements and the switch locking means being shown in this figure;

Fig. 7 is a section indicated by line 7—7 of Fig. 5 but showing the cupped member assembled with the support member;

Fig. 8 is a sectional detail of the struck-up elements for locking the switch handle in the selected position; and Fig. 9 is a perspective view of one of the sheet metal spacers.

Referring to the accompanying drawings and more particularly to Fig. 1 thereof, it is evident that my improved windshield wiper is provided with a support member 1 which preferably may be pressed out of a flat sheet of metal having a body portion 2 with a flange 3 extending about the same and merging into the flanges 4 of opposite extensions 5 of the body member which are adapted to be secured to the windshield standard or the like. For this purpose, small cupped sheet metal elements 7 may be disposed in interfitting engagement with the flanged extensions 5, each of the extensions and the corresponding cupped elements having aligned openings in which a metal bushing 8 may be pressed. Preferably a cushioning sleeve such as a rubber bushing 9 is disposed with each metal bushing 8 whereby the fastening means extending through the extension of the support is prevented from having metal to metal contact therewith.

A cupped member 11 preferably is shaped to have an interfitting engagement with the intermediate flanged portion 2 of the supporting member 1, this cup member preferably also being formed of sheet metal and having a flange engaging the outer surface of the flange 3, as shown in Fig. 1. The members 11 and 1 thus provide a chamber or housing 13 in which the drive gearing for the wiper blade may be disposed.

Fig. 5 shows this gearing, the motor running at a high speed drives a small pinion 15 (Fig. 3) which is mounted upon a portion of the motor shaft extending through the cupped member 11. This pinion meshes with a large gear 17 which carries a small gear 18 that in turn meshes with the periphery of a gear 19 which may be formed of any suitable non-resonant material. The gear 19 carries an eccentric 20 upon which an oscillating rack 21 is pivotally mounted. The back of this rack engages an idler roll 22 which holds the teeth of the rack in engagement with a gear 23 upon the wiper shaft 24. It is thus evident that the rotation of the gear 15 by the motor at comparatively high speed is effective in driving the wiping blade at a comparatively low speed through a limited oscillatory or rocking path.

Preferably the gears 17 and 19 are provided with hub portions 25 and 26 respectively that rotate upon stud elements 27 that project from the body portion 3 of support member 1. Preferably these stud elements have end portions 29 of reduced diameter which extend through suitable openings in the sheet metal of support member 1 and are riveted over against the same. The opposite ends of these stud elements are rounded in order to permit their more ready engagement with openings which preferably may be punched to a suitable diameter to permit the free fit of the ends of the stud elements within the same. Since the toothed portions of the various gears which engage each other are comparatively narrow and may be in a rather loose meshed engagement with each other, a slight misalignment of the same is not objectionable as long as the bearings therefor may rotate freely upon the supporting stud elements or axles without binding. These bearing surfaces are disposed advantageously to receive the imposed loads since they are located in the planes of the gears themselves.

A U-shaped bracket 40 is preferably arranged to form a frame or support for the motor. The legs of this bracket having transverse recesses 41, Fig. 4, into which nuts 42 are pressed, slots 43 extending from the ends of the legs transversely of these recesses and permitting fastening elements 45, Fig. 1, to be engaged in the same, such fastening elements preferably comprising bolts that extend through aligned openings in the interfitting sheet metal members. Thus the fastening elements 45 are effective not only in holding the motor support in place but in clamping the parts of the gear housing together.

While any suitable means may be utilized to space the sheet metal members of the gear housing, I prefer to employ the sheet metal members 50 disclosed more particularly in Figs. 6 and 9, these members preferably being resilient and having intermediate semi-circular portions 51 that are engaged with the outer sides of the fastening elements 45, while their ends may be pressed against the flanged portion of cup member 11, as shown in Fig. 6. The depth of these members is so determined that their edges may be engaged by the interfitting sheet metal members so that they form suitable spacers for the same as shown in Figs. 1 and 7. In order to insure the more secure positioning of the motor support 40 in place I preferably provide the end of each leg portion thereof with a rectilinear projection 49 engageable in a corresponding opening 50' in the wall of member 11. Thus the projections 49 and the bolts 45 cooperate in holding the U-shaped bracket 40 in place.

The legs of the latter have suitable rivets 57 extending therethrough and holding the field pieces 58 and the field coils 59 of the electric motor in place, the rivets being spaced from the latter by a suitable paper a control shaft extending through the gear spaced from the side of the bracket 40 and from the field pieces by suitable paper discs 62. The motor is provided with an armature 65, a commutator 66 and armature shaft 67. The bight portion of the bracket 40 carries a stud element 70 which may be riveted thereto and which engages a suitable cylindrical recess 71 in the outer end of the armature shaft 67. Preferably a fiber washer 73 or the like may be disposed between the extremity of the shaft and the adjoining face of bracket 40, and the cylindrical recess 73 preferably contains suitable lubricant carrying material 75 at the inner end of the stud element 70, such material, for example, being felt saturated in grease.

Fig. 3 shows the bearing arrangement at the opposite end of the motor shaft, this shaft extending through the member 11 to support the pinion 15 within the gear casing. At this point the sheet metal member 11 has an inturned boss portion 77 which forms a bearing for the shaft, a non-metallic washer 76 being held about the shaft by an annular member 77' that may be riveted to the wall of the housing 11 to cooperate with the inturned bearing boss 77 in opposing the movement of lubricant out of the gear casing to the region of the commutator. A suitable annular shield 80 is also preferably mounted upon this portion of the motor shaft to protect the commutator from grease or the like.

The outer face of the sheet metal housing member 11 preferably carries a pair of stud elements 82 which may be secured thereto by riveting, upon which are mounted rotatable bushings 84 of suitable insulating material that are also held in place by upsetting or riveting the outer ends of the stud elements. A sheet metal arm 85 is secured to each bushing 84 and carries a suitable brush 86. Each of the arms 85 is provided with a block 88 of insulating material forming a suitable eye portion to which one end of a tension spring 87 is connected, this spring being effective in drawing the arms toward each other and holding the brushes in yieldable engagement with commutator 66. Suitable electrical leads are connected to the respective brush arms in order to supply current to the motor. One of the arms 85 may be provided with an outwardly inclined end portion 91 which is engageable by a cam element or eccentric lug 92 upon one end of a rotatable shaft 93. The cam element 92 may, if desired, be constructed of metal, the slight sparking which may result at the instant of contact of the element with the end of the corresponding brush supporting arm being unobjectionable. Shaft 93 preferably extends through the gear housing and is adapted to extend through the windshield frame carrying a suitable switch handle 94 upon its inner end.

The wall of one of the sheet metal members, such as the member 11, is provided with struck-up portions 96 (Fig. 8) about the opening 95 through which the shaft 93 extends, these struck-up portions being segmental in shape as shown in Fig. 2 and providing abrupt ends and being resiliently engageable with a pin 99 disposed transversely in the shaft 93. Each of these segmental portions merge into a flat metal portion in the general plane of the sheet metal wall, such portions being designated by numeral 103. It is thus evident that the upstanding sheet metal elements 96 form resilient stops opposing movement of pin 99 but that they are sufficiently resilient to permit such a movement when the handle 95 is engaged with suitable pressure. Accordingly pin 99 cooperating with the struck-up elements 96 in effect forms detent means to secure the shaft and the cam in a position wherein the brush supporting arm is held out of engagement with the commutator so that current may no longer pass through the armature and the motor may cease running. It is thus evident that the arrangement of the brush in effect provides a switch without necessitating the use of separate parts.

Any suitable cover, such as the cup-like sheet metal member 110, may be disposed over the motor being secured to the outer face of bracket 40 by screws 111 or the like and having a flange peripheral portion 112 pressed into firm engagement with the wall of the sheet metal member 11.

It is further evident that the arrangement of the bearing members or assemblies and the riveted stud elements for bearings permits a compact and easily manufactured device, the provision of the interengaging sheet metal elements permitting low cost in manufacture and lightness and avoiding the necessity for expensive castings or the like, the various parts being so arranged that extreme accuracy in workmanship or care in assembly is not necessary to the quietness or reliability of the device, thereby permitting the use of inexpensive riveted fastening means and sheet metal stampings for many parts of the same.

I claim:

1. A windshield wiper actuating mechanism comprising a sheet metal support member, said member having an intermediate flanged portion, a cupped sheet metal member having a flange in interfitting engagement with the flanged portion of the support member and cooperating therewith to form a gear housing, gearing therein, a motor secured on the outer face of the cupped member and a shaft passing therethrough to drive the gearing, a wiper actuating shaft extending from the gearing through the support member, said motor having a commutator, brushes engaging the same, one of said brushes being mounted upon a swinging arm, a control shaft extending through the gear housing for moving said brush out of engagement with the commutator, and struck-up portions of one of said sheet metal members engaging means upon the control shaft to retain the same in a positon holding the brush away from the commutator.

2. A windshield wiper actuating mechanism comprising a sheet metal support member, said member having opposed portions for connection to a windshield frame and an intermediate flanged portion, a cupped sheet metal member having a flange in interfitting engagement with the flanged portion of the support member and cooperating therewith to form a gear housing, gearing therein, a motor secured on the outer face of the cupped member and a shaft passing therethrough to drive the gearing, a wiper actuating shaft extending from the gearing through the support member, a U-shaped bracket enclosing the motor, field coils carried thereon, and fastening means passing through the sheet metal members and connected to the U-shaped member to hold the former in interfitting engagement and to support the latter.

3. A windshield wiper actuating mechanism comprising a sheet metal support member, said member having opposed portions for connection to a windshield frame and an intermediate flanged portion, a cupped sheet metal member having a flange in interfitting engagement with the flanged portion of the support member and cooperating therewith to form a gearing housing, gearing therein, a motor secured on the outer face of the cupped member and a shaft passing therethrough to drive the gearing, a wiper actuating shaft extending from the gearing through the support member, a U-shaped bracket enclosing the motor, field coils carried thereon, and fastening means passing through the sheet metal members and connected to the U-shaped member to hold the former in interfitting engagement and to support the latter, the legs of said U-shaped member having recesses and slots extending to the recesses, and nuts engaged in the recesses, the fastening elements extending through the slots and engaging the nuts.

4. A windshield wiper actuating mechanism comprising a sheet metal support member, said member having an intermediate flanged portion, a cupped sheet metal member having a flange in interfitting engagement with the flanged portion of the support member and cooperating therewith to form a gear housing, gearing therein, a motor secured on the outer face of the cupped member and a shaft passing therethrough to drive the gearing, a wiper actuating shaft extending from the gearing through the support member, a U-shaped bracket enclosing the motor, field coils carried thereon, and fastening means passing through the sheet metal members and connected to the U-shaped member to hold the former in interfitting engagement and to support the latter, and spacers between the sheet metal members and associated with the fastening means, said spacers comprising sheet metal elements with their edges disposed to engage the interfitting sheet metal members.

5. A windshield wiper actuating mechanism comprising a sheet metal support member, said member having an intermediate flanged portion, a cupped sheet metal member having a flange in interfitting engagement with the flanged portion of the support member and cooperating therewith to form a gear housing, gearing therein, a motor secured on the outer face of the cupped member and a shaft passing therethrough to drive the gearing, a wiper actuating shaft extending from the gearing through the support member, a U-shaped bracket enclosing the motor, field coils carried thereon, and fastening means passing through the sheet metal members and connected to the U-shaped member to hold the former in interfitting engagement and to support the latter, the bight portion of said U-shaped member having a stud element riveted thereto, a motor shaft having a recess at its outer end rotatably engaging said stud element, whereby a bearing is provided for the shaft within the same.

6. A windshield wiper actuating mechanism comprising a sheet metal support member, said member having an intermediate flanged portion, a cupped sheet metal member having a flange in interfitting angagement with the flanged portion of the support member and cooperating therewith to form a gear housing, gearing therein, a motor secured on the outer face of the cupped member and a shaft passing therethrough to drive the gearing, a wiper actuating shaft extending from the gearing through the support member, a U-shaped bracket enclosing the motor, field coils carried thereon, means to support the U-shaped member, the bight portion of said U-shaped member having a stud element riveted thereto, a motor shaft having a recess at its outer end rotatably engaging said stud element, whereby a bearing is provided for the shaft within the same, and lubricant retaining substance within the recess at the end of the stud element.

7. A windshield wiper actuating mechanism comprising a sheet metal support member, said member having a flanged portion, a cupped sheet metal member having a flange in interfitting engagement with the flanged portion of the support member and cooperating therewith to form a gear housing, gearing therein, a motor secured on the outer face of the cupped member and shaft passing therethrough to drive the gearing, a wiper actuating shaft extending from the gearing through the support member, said motor having a rotatable armature and commutator, brushes engaging the latter, stud elements projecting from the cupped member, arms pivotally engaging said elements and supporting the brushes, and a spring drawing the arms toward each other and yieldably holding the brushes against the commutator.

8. Apparatus of the class described comprising a pair of sheet metal members, said members having flanged cupped portions in interfitting engagement, one of the members having an extension at each side, said extensions having flanges disposed in the same direction as that of the cupped portion of that member, and a small cupped member in interfitting engagement with each extension, aligned holes in each extension and the corresponding small cupped member, metal bushings in said holes, and a rubber bushing withing each metal bushing.

9. A windshield wiper actuating mechanism comprising a sheet metal support member, said member having opposed flanged portions for connection to a windshield frame and an intermediate flanged portion, a cupped sheet metal member having a flange in interfitting engagement with the intermediate flanged portion of the support member and cooperating therewith to form a gear housing, gearing within said housing, a motor secured to the outer face of the cupped member having its shaft passing therethrough and connected with said gearing, and a wiper actuating shaft extending from the gearing through the support member.

10. A windshield wiper actuating mechanism comprising a sheet metal support member, said member having opposed flanged portions for connection to a windshield frame and an intermediate flanged portion, a cupped sheet metal member having a flange in interfitting engagement with the intermediate flanged portion of the supporting member and cooperating therewith to form a gear housing, gearing within said housing, a motor secured to the outer face of the cupped member having its shaft passing therethrough and connected with said gearing, and a wiper actuating shaft extending from the gearing through the support member, said gearing including speed reducing gears, and means to impart an oscillatory movement to the wiper actuating shaft.

11. A windshield wiper actuating mechanism comprising a sheet metal support member, said member having opposed flanged portions for connection to a windshield frame and an intermediate flanged portion, a cupped sheet metal member having a flange in interfitting engagement with the intermediate flanged portion of the support member and cooperating therewith to form a gear housing, said sheet metal members having aligned openings, stud elements with end portions secured in said openings, gearing within said housing, a motor secured to the outer face of said cupped member and having its shaft passing therethrough and connected with said gearing, and a wiper actuating shaft extending from said gearing through the support member, said gearing including speed reducing gears mounted on said stud elements, and means to impart an oscillating movement to the wiper actuating shaft.

12. In apparatus of the class described, a supporting portion having recesses therein, an electric motor, a U-shaped sheet metal member engaging one end of the motor shaft and carrying its field coils, the legs of said member engaging the supporting portion and each having a slot communicating with the recess, nuts secured in said recesses, bolts extending from the supporting portion through said slots and engaging said nuts, and protuberant portions on the ends of said legs engaging the recesses in the supporting portion.

Signed by me at Lowell, Massachusetts this 22nd day of June 1929.

BUTLER AMES.